United States Patent
Panther et al.

(10) Patent No.: US 10,996,236 B2
(45) Date of Patent: May 4, 2021

(54) CONTROL DEVICE POSITION FEEDBACK WITH ACCELEROMETER

(71) Applicant: FISHER CONTROLS INTERNATIONAL LLC, Marshalltown, IA (US)

(72) Inventors: Mitchell Stephen Panther, Marshalltown, IA (US); Matthew J. Kemp, Marshalltown, IA (US); Davin Scott Nicholas, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 1096 days.

(21) Appl. No.: 14/338,065

(22) Filed: Jul. 22, 2014

(65) Prior Publication Data

US 2016/0025765 A1  Jan. 28, 2016

(51) Int. Cl.
*G01P 15/00* (2006.01)
*H04L 29/06* (2006.01)
(Continued)

(52) U.S. Cl.
CPC .......... *G01P 15/00* (2013.01); *F16K 37/0041* (2013.01); *G01B 21/00* (2013.01); *G01D 5/12* (2013.01); *H04L 29/06163* (2013.01)

(58) Field of Classification Search
CPC ..... G01C 21/16; G01P 15/00; F16K 37/0041; G01B 21/00; G01D 5/12; H04L 29/06163; H04L 12/2863
See application file for complete search history.

(56) References Cited

U.S. PATENT DOCUMENTS

2003/0045998 A1*  3/2003  Medl .................. G01C 21/00
                                                    701/500
2005/0276233 A1*  12/2005 Shepard .............. H04L 45/42
                                                    455/426.2

(Continued)

FOREIGN PATENT DOCUMENTS

CN          103851247 A    6/2014
EP           2495472 A2    9/2012
(Continued)

OTHER PUBLICATIONS

Chraim et al. Wireless Valve Position Monitoring: A MEMS Approach, IECON 2013—39th Annual Conference of the IEEE Industrial Electronics Society, 2013, pp. 4016-4021.*
(Continued)

*Primary Examiner* — Catherine T. Rastovski
*Assistant Examiner* — Liam R Casey
(74) *Attorney, Agent, or Firm* — Marshall, Gerstein & Borun LLP

(57) ABSTRACT

An accelerometer wireless position transducer or sensor is physically coupled to a control device in a process control system and includes an accelerometer that generates a signal based on a position of the control device or its actuator. The transducer converts the accelerometer signal into a wireless signal that includes a value indicative of the actuator position, and causes the wireless position feedback signal to be transmitted over a wireless channel to a valve controller, e.g., by using a short-range wireless protocol. The controller controls the valve based on the value included in the wireless signal. In some configurations, the feedback signal is received at a device paired with the transducer, and the paired device transmits the feedback signal to the controller. The paired device may be paired with multiple transducers (Continued)

and/or sensors, and may transmit various feedback signals to multiple recipient controllers and other devices.

16 Claims, 6 Drawing Sheets

(51) Int. Cl.
  *G01B 21/00* (2006.01)
  *F16K 37/00* (2006.01)
  *G01D 5/12* (2006.01)

(56) References Cited

U.S. PATENT DOCUMENTS

| | | |
|---|---|---|
| 2006/0028997 A1 | 2/2006 | McFarland |
| 2009/0316628 A1* | 12/2009 | Enns ............... H04W 92/02 370/328 |
| 2010/0190442 A1* | 7/2010 | Citrano, III ........ G05B 19/4185 455/41.2 |
| 2011/0110291 A1* | 5/2011 | Ishii ................. H04B 7/155 370/315 |
| 2011/0214956 A1 | 9/2011 | Marking |
| 2012/0325321 A1* | 12/2012 | Perry ............... B23Q 11/1023 137/1 |
| 2013/0019683 A1 | 1/2013 | Carder et al. |
| 2013/0041481 A1* | 2/2013 | Seberger ............ G05B 19/44 700/28 |
| 2013/0070745 A1* | 3/2013 | Nixon ............... H04W 84/02 370/338 |
| 2013/0286945 A1* | 10/2013 | Fulknier ............ H04L 45/60 370/328 |
| 2013/0305825 A1* | 11/2013 | Comparetto ........ G01N 29/4427 73/579 |
| 2014/0005960 A1 | 1/2014 | Anderson et al. |
| 2014/0144530 A1 | 5/2014 | Miller |
| 2017/0182859 A1* | 6/2017 | Anderson ............ B60G 17/052 |

FOREIGN PATENT DOCUMENTS

| | | | |
|---|---|---|---|
| RU | 1090131 A1 | 2/1996 | |
| WO | WO-2008103915 A1 * | 8/2008 | ............ G16H 40/67 |
| WO | WO-2013/116423 A1 | 8/2013 | |

OTHER PUBLICATIONS

U.S. Appl. No. 13/858,986, filed Apr. 9, 2013.
U.S. Appl. No. 14/307,216, filed Jun. 17, 2014.
International Preliminary Report on Patentability for corresponding International Application No. PCT/US2015/041523, dated Feb. 2, 2017.
International Search Report and Written Opinion for corresponding International Application No. PCT/US2015/041523, dated Oct. 13, 2015.
First Office Action for Chinese Patent Application No. 201510406101.3, dated Aug. 3, 2018.
Office Action for Russian Application No. 2017103142/28, dated Feb. 1, 2019.
Extended European Search Report for European Patent Application No. 18193732.7, dated Feb. 4, 2019.
Second Office Action for Chinese Patent Application No. 201510406101.3, dated May 7, 2019.
Third Office Action for Chinese Patent Application No. 201510406101.3, dated Oct. 24, 2019.
Fourth Office Action for Chinese Patent Application No. 201510406101.3, dated Jun. 24, 2020.
Sun et al., "Internet of Things in Prisons," Tsinghua Universirty Press, pp. 93-94 (2012).
Wu et al., "Internet of Things Engineering and Application," Xidian University Press, pp. 147-149 (2014).

* cited by examiner

CONTROL DEVICE POSITION FEEDBACK WITH ACCELEROMETER

CROSS REFERENCE TO RELATED APPLICATIONS

This application is related to U.S. patent application Ser. No. 14/086,102, entitled "Wireless Position Transducer for a Valve" and filed on Nov. 21, 2013, the entire disclosure of which is hereby incorporated by reference herein.

FIELD OF THE INVENTION

The present disclosure relates generally to process control devices such as valves and, more particularly, to methods, systems, and apparatuses to provide feedback on the position of a process control device in a process control system.

BACKGROUND

Electronic controller devices (e.g., an electro-pneumatic controller, programmable controllers, analog control circuits, etc.) are typically used to control process control devices (e.g., control valves, pumps, dampers, etc.). These electronic controller devices cause a specified operation of the process control devices. For purposes of safety, cost efficiency, and reliability, many well-known diaphragm-type or piston-type pneumatic actuators are used to actuate process control devices and are typically coupled to the overall process control system via an electro-pneumatic controller. Electro-pneumatic controllers are usually configured to receive one or more control signals and convert those control signals into a pressure provided to a pneumatic actuator to cause a desired operation of the process control device coupled to the pneumatic actuator. For example, if a process control routine requires a pneumatically-actuated valve to pass a greater volume of a process fluid, the magnitude of the control signal applied to an electro-pneumatic controller associated with the valve may be increased (e.g., from 10 milliamps (mA) to 15 mA in a case where the electro-pneumatic controller is configured to receive a 4-20 mA control signal).

Electro-pneumatic controllers typically use a feedback signal generated by a feedback sensing system or element (e.g., a position sensor) that senses or detects an operational response of a pneumatically-actuated control device. In an example, in the case of a pneumatically-actuated valve, the feedback signal may be a feedback current signal corresponding to the position of the valve as measured or determined by a position sensor. Typically, the feedback current signal corresponding to the position of the valve is transmitted to the controller via a wired or wireless connection, and the position of the valve is calculated by the controller, e.g., based on a voltage differential across a resistor at two inputs of the controller.

In some systems, a pneumatically-activated valve is connected in a wired manner to both an electric isolator and to a electro-pneumatic controller. The electric isolator is also connected in a wired manner to the electro-pneumatic controller. As such, the valve has a first connection directly to the controller, and a second connection to the controller through the electric isolator. The electric isolator provides power to both the valve and the controller from a three-pronged AC power supply, and causes feedback current signals from the valve to be delivered to the controller over a resistance. As both the valve and the controller are powered by a same power supply, the use of the electric isolator minimizes the occurrence of ground loops.

The controller determines a voltage differential between two electrical input connections from the valve, i.e., between a first wired connection at which a feedback current signal is directly received from the valve, and a second wired connection at which the feedback current signal is received from the valve over the resistance associated with the electric isolator. The controller then uses the voltage differential to calculate a position of the actuator of the valve, compares the calculated position to a desired set-point or control signal, and utilizes a position control process to generate a drive value based on (e.g., a difference between) the calculated position and the control signal. This drive value corresponds to a pressure to be provided to the pneumatic actuator to achieve a desired operation of the control device (e.g., a desired position of a valve) coupled to the pneumatic actuator.

In some systems, a wireless position transducer converts a motion or a position of an actuator of the valve into a wireless signal including a value indicative of the position of the actuator. The transducer may include, for example, a potentiometer, a magnetic sensor or array of sensors, a piezo-electric transducer, a Hall effect sensor, a string potentiometer, etc., and the transducer causes the wireless signal to be transmitted over a wireless communication channel to a valve controller, such as by using the WirelessHART®, Wi-Fi®, or other wireless protocol. The valve controller may then control the valve based on the value included in the wireless signal.

SUMMARY

In accordance with a first exemplary aspect, a device for providing feedback on the position of a process control device used in controlling a process operating in a process control system (e.g., a valve, a pump, a damper, etc.) may have an accelerometer coupled to the process control device. For ease of discussion, the device for providing the feedback position of the control device is interchangeably referred to herein as a "position feedback device," "position sensor," "position transducer," "sensor device," "transducer device," or "position sensor/transducer." The position sensor/transducer may also have a processor to convert a signal generated by the accelerometer into a signal that includes a value indicative of a position of an actuator coupled to the control device. Further, the position sensor/transducer may have a communication interface to transmit a wireless signal indicative of the position of the actuator, and a connection to a power source to power the processor and the communication interface.

In accordance with a second exemplary aspect, a method performed by a position sensor/transducer may include receiving a signal generated by an accelerometer coupled to an actuator of a control device used in controlling a process operating in a process control system. The control device may be, for example, a valve, a pump, a damper, etc. The method may further include converting a value of the signal generated by the accelerometer into a value indicative of a position of the actuator, and causing the signal to be wirelessly transmitted, from the position sensor/transducer, for use by a controller that controls the control device based on the position of the actuator.

In accordance with a third exemplary aspect, a feedback device for providing position feedback in a process control system may include a first communication interface to receive a wireless signal indicative of a position of an actuator coupled to a control device used in controlling a process operating in the process control system. The wireless signal may be generated by using an accelerometer included in a position sensor/transducer that is paired with the feedback device and that is attached to the control device. The feedback device may further include a signal generator to generate and transmit a position feedback signal that is based on the received wireless signal. The position feedback signal may be transmitted via the first communication interface of the feedback device or via a second communication interface of the feedback device to at least one of a controller of the control device or a control system host of the process control system. The feedback device may be paired with multiple position sensor/transducers, and the feedback device may transmit feedback signals to multiple controllers or other devices of the process control system.

In accordance with any one or more of the foregoing first, second, or third aspects, a device for providing position feedback of a process control device (e.g., a position feedback device, position sensor, position transducer, sensor device, transducer device, or position sensor/transducer) and/or method may further include any one or more of the following preferred forms.

In one preferred form, the wireless signal and/or position feedback signal is transmitted to a controller of the control device and/or a control system host of the process control system.

In another preferred form, the communication interface of the position sensor/transducer is coupled to a wireless communication channel, the wireless communication channel forms an exclusive connection between the position sensor/transducer and the feedback device paired with the position sensor/transducer, and the feedback device is communicatively connected to the controller of the control device.

In another preferred form, the power source of the position sensor/transducer is rechargeable.

In a further preferred form, the position sensor/transducer includes an energy harvester to harvest energy generated by one or more portions of the position sensor/transducer to recharge the power source.

In yet another preferred form, the processor of the position sensor/transducer converts the signal generated by the accelerometer using a value indicative of a calibrated position of the control device.

In another preferred form, the wireless signal transmitted by the position sensor/transducer is accordance with a WirelessHART® protocol or a Zigbee® protocol.

In another preferred form, the control device is a valve.

In a preferred method, the method includes powering the position sensor/transducer by using an energy storage device included in or proximate to the position sensor/transducer.

In another preferred method, the method includes recharging the energy storage device by using solar energy, a temporary connection of the energy storage device to an energy source, recovered energy from a local vibration or movement, and/or induction from a proximity charger.

In another preferred method, causing the signal to be wirelessly transmitted from the position sensor/transducer may include causing the signal to be wirelessly transmitted over a wireless communication channel between the position sensor/transducer and a paired device, wherein the paired device is in communicative connection with the controller.

In another preferred method, causing the signal to be wirelessly transmitted from the position sensor/transducer includes causing the signal to be wirelessly transmitted using the wireless HART communication protocol or a short-range wireless protocol.

In yet another preferred method, the method includes calibrating the position sensor/transducer to an initial position of the actuator or control device, and converting the value of the signal generated by the accelerometer includes converting the value of the signal generated by the accelerometer based on the initial position of the actuator or control device.

In another preferred form, the wireless signal received by the feedback device is a first wireless signal, and the position feedback signal generated by the feedback device is a second wireless signal.

In another preferred form, the feedback device is paired with multiple devices, and the position sensor/transducer is included in the multiple devices.

In yet another preferred form, the wireless signal transmitted by the position sensor/transducer is a first wireless signal and the position sensor/transducer is a first sensor device included in the multiple devices. Additionally, the actuator is a first actuator, the control device is a first control device, and the position feedback signal is a first position feedback signal. The feedback device is paired with a second sensor device included in the multiple devices to receive a second wireless signal, where the second sensor device corresponds to a second control device. The second wireless signal is generated by the second sensor device and is indicative of a position of a second actuator coupled to the second control device. Further, the signal generator generates and transmits a second position feedback signal to a controller of the second control device or to the control system host. The second position feedback signal may be based on the received second wireless signal.

In another preferred form, the accelerometer generates an output signal, and a value of the wireless signal received by the feedback device is based on the output signal generated by the accelerometer.

In another preferred form, the wireless signal received by the feedback device comports with a first short-range wireless protocol, and the position feedback signal generated by the feedback device comports with the first short-range wireless protocol, a second short-range wireless protocol, or the wireless HART protocol.

DETAILED DESCRIPTION

Figure 1:
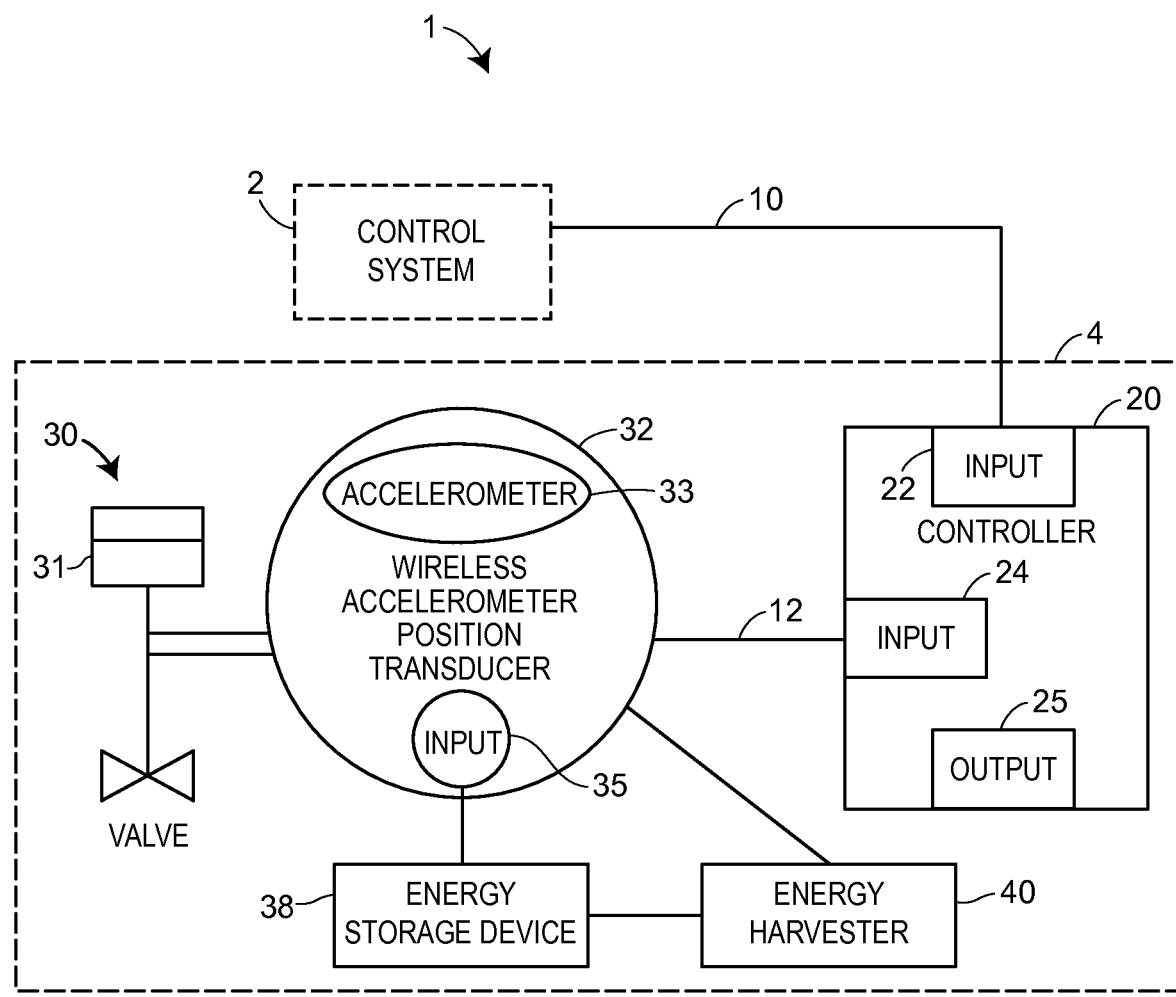
FIG. 1 is a block diagram of an example process control system including an example wireless accelerometer position transducer or sensor that is in wireless communication with a controller of a process control device of the process control system.

Although the following describes example methods and apparatus including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the following describes example methods and apparatus, the examples provided are not the only way to implement such methods and apparatus.

Typically, in a process control system, a controller (e.g., an electro-pneumatic controller) is directly coupled to a process control device (e.g., a valve or control valve, a pump, a damper, etc., and also interchangeably referred to herein as a "control device"). A position sensor coupled to the control device measures the movement of an actuator coupled to the control device, and provides, over a wired connection, feedback indicative of the position or state of the control device to a controller of the control device. For example, the position sensor provides a resistive output that indicates the travel or the position of the actuator to the controller of the control device. The controller calculates a position of the actuator based on a voltage differential across the resistive output, compares the position with a desired control signal or setpoint, and outputs a signal to control the control device based on the comparison.

Additionally or alternatively, in some process control systems, a known position sensor or transducer of a control device is wirelessly coupled to a controller. The wireless coupling of the controller to the position sensor or transducer enables the controller to wirelessly receive a feedback signal, from the position transducer, that indicates the position of the control device.

In many cases, such known position sensors or transducers include a magnet or magnet array that is attached to the control device. For example, a known magnet sensor system includes a magnet array is attached to the stem or actuator of a valve, and includes a separate Hall-effect sensor or other magnetic force detector that is capable of detecting and/or measuring magnetic forces generated by the magnet array. The magnetic force detector is not attached or physically coupled to the valve, but instead is positioned in suitable proximity to the magnet array. Consequently, as the stem or actuator of the valve moves, the magnetic force detector detects the magnetic force generated by the attached magnet or magnet array, and the magnetic force detector translates the magnitude of the detected force into an indication of a current position or motion of the control device. As such, the position or motion of the control device is secondarily derived by a device that is physically uncoupled from the control device.

This approach, though, suffers from several drawbacks. Notably, the magnet or magnet array, i.e., the primary source of position or motion detection, is sensitive to changes in temperature. Accordingly, accuracy can be compromised when environmental temperatures change or vary, which is especially common in outdoor process control environments and/or with endothermic or exothermic processes. As such, magnet sensor systems must be compensated for shifts in temperature to maintain accuracy within acceptable tolerances. For example, the magnet or magnet array sensor typically is subject to an additional temperature cycle during manufacturing to compensate for possible temperature changes.

Additionally, magnet sensor systems are limited in their possible physical mounting arrangements as the magnetic force detector must be disposed within a narrow range of orientations and distances with respect to the attached magnet or magnet array. Thus, in some process control systems, optimal positioning between the magnet/magnet array and magnetic force detector can be challenging (and sometimes not even possible) given the particular equipment and piping topology of the process control system.

Further, magnet sensor systems require multiple calibration steps for position sensing purposes, both initially and over time. For example, a first initial position sensing calibration must be performed based on the range of travel of the control device, and a second initial position sensing calibration based on the distance and orientation of the magnetic force detector must be performed. Re-calibration may also be required, e.g., when the orientation and disposition of the magnetic force detector with respect to the magnet/magnet array shift during operation of the process plant (e.g., due to vibrations, temperatures, etc.), and/or when the magnetic force detector is replaced.

Still further, as control devices vary in size and have different ranges of travel, differently-sized magnet sensor systems must be manufactured to service the differently-sized control devices, thus increasing manufacturing, equipment, and installation costs.

Embodiments of the systems, apparatuses, and the methods disclosed herein provide techniques by which any or all of these drawbacks may be mitigated. In particular, the systems, apparatuses, and methods disclosed herein are directed to a position sensor that is attachable to a process control device and that includes an accelerometer. Such a position sensor is generally referred to herein as "an accelerometer position sensor." The accelerometer position sensor further includes a processor to receive a signal from the accelerometer and convert the received signal into a signal indicative of a position of the portion of the control device (e.g., the actuator, stem, etc.) to which the accelerometer position sensor is attached. The position signal may be wirelessly transmitted by the position sensor to a controller of the control device, for example, to provide feedback indicative of the position of the control device. For example, the position sensor may directly transmit the position signal to the controller, or the position sensor may transmit the position signal, e.g., by using a short-range wireless protocol, to a device that is partnered or paired with the position sensor, and the paired or partner device may forward the position signal (in some cases, by using a different protocol) to the controller of the control device. Thus, a position of the control device may primarily be determined by a position sensor that is physically coupled or attached to the control device, rather than being derived secondarily by another, de-coupled device, that is, an accelerometer position sensor that is attached to a control device may directly measure the true position and/or movement of elements or parts of the control device.

As accelerometers are generally not as sensitive to temperature changes as compared to magnets, the accelerometer sensor device may have significantly smaller temperature shift as compared to that of known magnetic sensor systems. Indeed, the magnitude of the temperature shift of the accelerometer may allow accuracy to be maintained within the required tolerances of a process control system without requiring any additional cycles during manufacturing. For example, a 1% or less change in accuracy over temperature may be achieved by using the accelerometer position sensor.

Further, as the mounted accelerometer position sensor serves as a primary position detector, the paired or partner device (if one is used) need not be as carefully oriented and positioned as magnetic force detectors of magnet sensor systems. Rather, the paired or partner device need only be situated within a wireless transmission range of the mounted accelerometer sensor. Thus, greater flexibility in placement of the paired or partner device is afforded. For example, the paired or partner device may simply be mounted or placed on a stand that is anywhere within wireless communication range of the mounted accelerometer sensor, and as such may not require a specialized or complex mounting kit.

Indeed, the same paired or partner device (e.g., a single paired or partner device) may easily receive position-indicative signals from multiple accelerometer position sensors that are respectively attached to different respective control devices, so long as the paired or partner device is within wireless communication range of each of the multiple accelerometer position sensors. Such a many-to-one configuration may result in lesser equipment and installation costs, as well as may decrease bandwidth usage on wireless networks (as a smaller overall number of devices are utilizing the wireless network). Additionally, such a many-to-one configuration may also allow for easier installation of controllers that require multiple inputs.

Further, as the mounted accelerometer position sensor serves as a primary position detector, the accelerometer position sensor may advantageously require only a single calibration for position sensing purposes, e.g., an initial calibration based on the range of travel of the control device. The paired or partner device (if one is used) may not require calibration for position sensing purposes. In fact, replacement paired or partner devices may be introduced without requiring any position sensing calibration.

Moreover, accelerometer position sensors generally are not dependent on the size of the part of the control device to which they are attached. As such, the need to manufacture different sizes or types of position sensors for differently-sized control devices is moot. Indeed, a single manufactured type of sensor may be able to service any and all ranges of travel of different control devices.

The disclosed methods, systems, and apparatuses including accelerometer position sensors are described below in conjunction with examples involving an electro-pneumatic digital valve controller and a pneumatically actuated valve. However, it is understood that these examples are not limiting. In fact, the disclosed methods and apparatus may be implemented with other types of controllers, with valves actuated in other manners, and/or with process control devices other than valves.

FIG. 1 is a diagram of a process control system 1 including a control system 2 and a process control area 4. The process control system 1 may be included in a process plant, such as a petroleum, chemical and/or other type of industrial process plant, and the process control system 1 may control one or more processes executed by the process plant. The control system 2 may include workstations, controllers, marshalling cabinets, input/output cards, and/or any other type of process control system management components (not shown in FIG. 1). In some process plants, the control system 2 is located in a different area than the process control area 4 such as an enclosed room, e.g., to shield the control system 2 from noise, dust, heat, and other undesired environmental conditions. The control system 2 may be in communicative connection with a controller 20, e.g., an electro-pneumatic controller, located in the process control area 4. The control system 2 may power the controller 20, or the controller 20 may be powered by a local energy source, such as an external voltage source, solar power, battery power, a capacitor, etc.

The controller 20 may include a communication interface or input 22 via which signals from the control system 2 and/or to the control system 2 may be received and sent over one or more communication channels 10. The one or more communication channels 10 may include a wired communication channel, a wireless communications channel, or both a wired and a wireless communication channel. Accordingly, the interface 22 may be a wired interface, a wireless interface, or both a wired and a wireless interface. The interface 22 may be configured to communicate with a control host, other controllers, and/or other elements included in the control system 2. In an embodiment, the interface 22 is configured to communicate with other controllers and/or elements included in the process control area 4.

In an embodiment, the interface 22 may receive, from the control system 2, control signals over the channel(s) 10 that specify or correspond to a desired valve state for a valve 30 that is located in the process control area 4. For example, the control signals received by the electro-pneumatic controller 20 using the interface 22 may cause a pneumatic actuator 31 coupled to the valve 30 to be open, closed, or moved to some intermediate position.

The control signals (e.g., input signals) received at the interface 22 may include, for example, a 4-20 mA signal, a 0-10 Volt Direct Current (VDC) signal, a wireless signal, and/or digital commands, etc. For example, in a case where the control signal is a 4-20 mA signal, a digital data communication protocol such as, for example, the well-known Highway Addressable Remote Transducer (HART®) protocol may be used to communicate over a wired connection 10 with the electro-pneumatic controller 20. In another example, the control signal may be a wireless control signal received over a wireless communication channel 10 using the WirelessHART protocol. In other examples, the control signal may be a 0-10 VDC signal, or other type of signal. Such digital communications may be used by the control system 2 to retrieve identification information, operation status information and diagnostic information from the electro-pneumatic controller 20. Additionally or alternatively, such digital communications may be used by the control system 2 to effect control of the valve 30 through its respective controller 20.

The example electro-pneumatic controller 20 of FIG. 1 may control the position of the actuator 31 and, thus, the position of the valve 30. The electro-pneumatic controller 20 may include, although not shown, a control unit, a current-to-pneumatic (I/P) converter, and a pneumatic relay. In other examples, the electro-pneumatic controller 20 may include any other components for controlling and/or providing pressure to the valve actuator 31. Additionally, the electro-pneumatic controller 20 may include other signal processing components such as, for example, analog-to-digital converters, filters (e.g., low-pass filters, high-pass filters, and digital filters), amplifiers, etc. For example, the control signal received from the control system 2 may be filtered (e.g., using a low/high pass filter) prior to being processed by a control unit within the electro-pneumatic controller 20.

More specifically, the electro-pneumatic controller 20 may control the position of the actuator 31 by comparing a wireless feedback or position signal generated by a wireless accelerometer position transducer or sensor 32 to the control signal originating from the control system 2. The wireless feedback signal generated by the wireless accelerometer position feedback sensor 32 may be, for example, in accordance with the Zigbee®, Bluetooth®, Wi-Fi, ultra-wideband (UWB), infrared (IR) or some other suitable short-range wireless protocol or near field wireless communications (NFC) protocol. In some embodiments, the wireless position feedback signal may be in accordance with the WirelessHART protocol. At any rate, the wireless feedback signal may include data or a value indicative of the current position of the valve 31, and the wireless feedback signal may be transmitted from the sensor 32 to the controller 20 over one or more wireless communications channels 12.

The wireless position feedback signal generated by the wireless accelerometer position transducer or sensor 32 may be received by the electro-pneumatic controller 20 at a second communication interface or input 24, coupled to the wireless channel(s) 12. The interface 24 may include a wireless transceiver, or a wireless receiver. The electro-pneumatic controller 20 may determine the feedback signal based on the wireless feedback or position signal received from the wireless accelerometer position transducer 32 via the second interface 24. In an embodiment, the first interface 22 and the second interface 24 may be integrated into a single wireless interface.

The control signal provided by the control system 2 may be used by the electro-pneumatic controller 20 as a set-point or reference signal corresponding to a desired operation (e.g., a desired position corresponding to a percentage of a control valve 30 operating span) of the valve 30. The control unit (not shown) within the electro-pneumatic controller 20 may compare the wireless feedback signal to the control signal by using the control signal and the wireless feedback signal as values in a position control algorithm or process to determine a drive value. The position control process performed by the control unit may determine (e.g., calculates) the drive value based on the difference between the feedback signal and the control signal. This calculated difference corresponds to an amount the electro-pneumatic controller 20 is to change the position of the actuator 31 coupled to the valve 30, in an embodiment. The calculated drive value also corresponds to a current generated by the control unit to cause an I/P converter within the electro-pneumatic controller 20 to generate a pneumatic pressure, in an embodiment. The electro-pneumatic controller 20 outputs the drive signal via an output 25 to control the valve 30, for example.

In an embodiment, the I/P converter within the electro-pneumatic controller 20 is included in the output 25. The I/P converter may be a current-to-pressure type transducer that generates a magnetic field based on the current applied through the solenoid. The solenoid may magnetically control a flapper that operates relative to a nozzle to vary a flow restriction through the nozzle/flapper to provide a pneumatic pressure that varies based on the average current through the solenoid. This pneumatic pressure may be amplified by a pneumatic relay and applied to the actuator 31 coupled to the valve 30. The pneumatic relay within the electro-pneumatic controller 20 may be pneumatically coupled to the actuator 31 to provide the actuator 31 with a pneumatic pressure (not shown).

For example, a drive value that increases the current generated by the control unit within the electro-pneumatic controller 20 may cause the pneumatic relay to increase a pneumatic pressure applied to the pneumatic actuator 31 to cause the actuator 31 to position the valve 30 towards a closed position. Similarly, drive values that decrease the current generated by the control unit may cause the pneumatic relay to decrease the pneumatic pressure applied to the pneumatic actuator 31 to cause the actuator 31 to position the valve 30 towards an open position.

In other examples, the output 25 of the electro-pneumatic controller 20 may include a voltage-to-pressure type of transducer, in which case the drive signal is a voltage that varies to provide a varying pressure output to control the valve 30. Additionally, other examples of outputs may implement other types of pressurized fluid including pressurized air, hydraulic fluid, etc.

Turning to the example valve 30 of FIG. 1, the valve 30 may include a valve seat defining an orifice that provides a fluid flow passageway between an inlet and an outlet, in an embodiment. The valve 30 may be, for example, a rotary valve, a quarter-turn valve, a motor-operated valve, a damper, or any other control device or apparatus. The pneumatic actuator 31 coupled to the valve 30 may be operatively coupled to a flow control member via a valve stem, which moves the flow control member in a first direction (e.g., away from the valve seat) to allow fluid flow between the inlet and the outlet and in a second direction (e.g., toward the valve seat) to restrict or prevent fluid flow between the inlet and the outlet. The actuator 31 coupled to the example valve 30 may include a double-acting piston actuator, a single-acting spring return diaphragm or piston actuator, or any other suitable actuator or process control device.

To control the flow rate through the valve 30, the valve may be coupled to the wireless accelerometer position transducer or sensor 32. In an embodiment, the wireless accelerometer position transducer 32 includes an accelerometer 33 to sense the position of the actuator 31 coupled to the valve 30, e.g., a position accelerometer 33. For example, the accelerometer 33 may be a micro electro-mechanical systems (MEMS)-based accelerometer, such as a MEMS multi-axis accelerometer (e.g., MEMS 3-axis sensor, or other suitable multi-axis accelerometer).

The accelerometer 33 of the wireless accelerometer position transducer 32 may primarily sense or detect the position of the actuator 31 and, thus, the position of the flow control member relative to the valve seat (e.g., an open position, a closed position, an intermediate position, etc.). In an embodiment, the wireless accelerometer position transducer 32 may generate, based on the accelerometer 33, a wireless feedback signal, and the wireless accelerometer position transducer 32 may cause the wireless feedback signal to be transmitted to the electro-pneumatic controller 20. The wireless feedback signal may represent a position of the actuator 31 coupled to the valve 30 and, thus, a position of the valve 30. The example techniques, methods and apparatus described herein enable the electro-pneumatic controller 20 to receive a feedback signal from any type of example wireless accelerometer position transducer or sensor 32 of FIG. 1 that can be coupled to the valve 30.

Generally, the position accelerometer 33 of the wireless accelerometer position transducer or sensor 32 is less substantially affected by adverse environmental conditions than magnet sensor arrays. Notably, the wireless accelerometer position transducer 32 may be accurate across a range of temperatures to which it may be subjected in the process plant environment without requiring compensation, e.g., during the manufacturing process. Additionally, the wireless accelerometer position transducer 32 may include electromagnetic suppression circuitry, noise filtering circuitry, vibration immunity components, and/or radiation shielding components to further isolate or protect the position accelerometer 33 from other adverse environmental conditions.

The wireless accelerometer position transducer 32 may include an input or connection 35 that receives power from a local power source or energy storage device 38. In an embodiment, the local power source or energy storage device 38 is included with the wireless accelerometer position transducer or sensor 32 as an integral unit. In an embodiment, the local power source or energy storage device 38 is rechargeable. For example, the local power source or energy storage device 38 may be a battery, capacitor, or other rechargeable energy storage device. Any known technique for recharging the local power source or energy storage device 38 may be used, such as capturing solar energy; replacing a battery; harvesting or recovering energy from local heat, vibration and/or movement; temporarily connecting to a plug-in source such as a AC power source; inductively recharging using a proximity charger; or other suitable recharging technique. In the embodiment illustrated in FIG. 1, the energy storage device 38 is connected to an energy harvester 40, which harvests energy from the wireless accelerometer position sensor 32 to recharge the energy storage device 38. For example, the energy harvester 40 may harvest energy from the accelerometer 33 and/or other elements or portions of the position sensor 32.

While the electro-pneumatic controller 20 and the wireless accelerometer position transducer 32 in FIG. 1 are shown as being located within the process control area 4, each of the electro-pneumatic controller 20 and the wireless accelerometer position transducer or sensor 32 may be located in a respective different operating environment and communicatively coupled together via one or more wireless communication channels, such as via wireless communication channels included in a wireless communication network of the process plant or control environment 1. For example, the wireless accelerometer position transducer 32 may be located within a relatively high temperature and high humidity environment (e.g., 90% humidity and 180 degrees Fahrenheit (° F.) while the electro-pneumatic controller 20 is located in a controlled environment set to 10% humidity and 72° F.

Additionally, in an embodiment, the wireless communication channel 12 may be an exclusive connection between the wireless accelerometer position transducer 32 and the controller 20, in an embodiment. In particular, no wires connect the wireless accelerometer position transducer 32 and the controller 20. As such, the wireless accelerometer position transducer or sensor 32 does not require any other connections (other than the wireless communication channel 12) to receive power or to communicate with the controller 20. Indeed, with the techniques of the present disclosure, an electric isolator is not needed to provide power to the wireless accelerometer position sensor 32. Rather, as the wireless accelerometer position sensor 32 may be powered by a local source 38 (which, in some embodiments, is included in the wireless accelerometer position transducer 32 itself), cumbersome wires need not be routed to the transducer 32 (and need not be maintained) in order to power the transducer 32. Furthermore, as the transducer 32 and the controller 20 are powered by different, separate and distinct power sources, the need for an electric isolator to minimize ground loops is moot.

Still further, with the techniques of the present disclosure, an electric isolator is also not needed to apply feedback current signals generated by the transducer 32 across a resistance in order for the controller 20 to calculate a position of the actuator 31 of the transducer 32. In particular, instead of requiring two inputs at the controller 20 to determine a voltage differential, and requiring that the controller 20 calculate the position of the actuator 31 based on the determined voltage differential, the controller 20 merely receives the signal (e.g., a packet) from the wireless accelerometer position transducer 32 at an input 24 coupled to the wireless channel 12. From the wireless signal, the controller 20 extracts a populated value from a field in the signal, where the populated value is indicative of the position of the actuator 31. In an embodiment, the populated value from the wireless signal is the only input or value received from the wireless accelerometer position transducer 32 that is used by the controller 20 to determine the position of the actuator 31; a second input or value from the wireless accelerometer position transducer 32 is not needed. Accordingly, with the techniques of the present disclosure, not only are the electric isolator and the wires connecting the isolator, the valve and the controller not needed, but the additional hardware, processing time and memory required for the controller to calculate a position of the actuator 31 is also not required.

Figure 2:
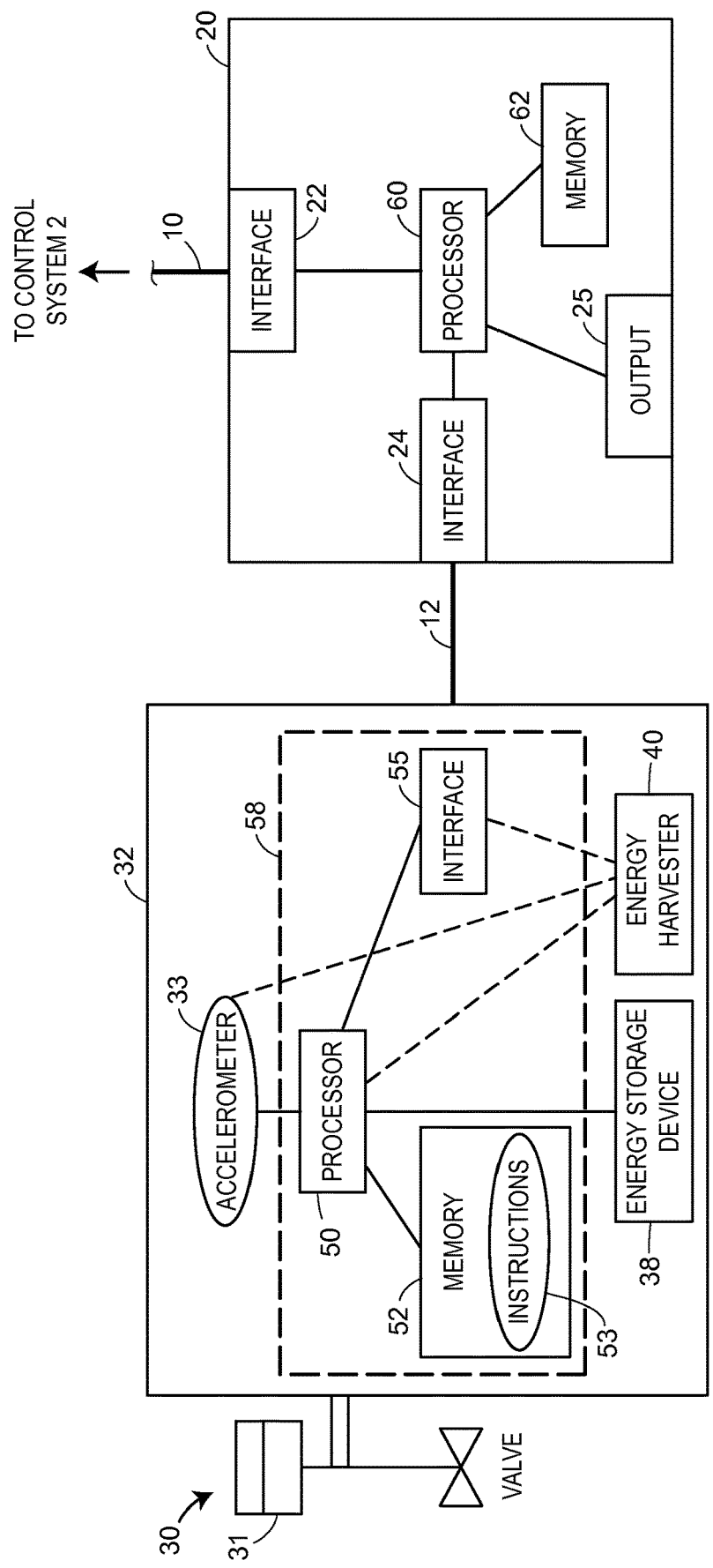
FIG. 2 is a detailed block diagram of the example wireless accelerometer position transducer or sensor and the controller of FIG. 1.

A detailed block diagram of the wireless accelerometer position transducer or sensor 32 is shown in FIG. 2. As previously discussed, the wireless accelerometer position sensor 32 may include a position accelerometer 33 coupled to the actuator 31 of the valve 30. The wireless accelerometer position sensor 32 may further include a processor 50 coupled to the accelerometer 33 and to a memory 52. The memory 52 may be a tangible, non-transitory memory, and may include one or more computer-readable storage media. For example, the memory 52 may be implemented as one or more semiconductor memories, magnetically readable memories, optically readable memories, and/or any other suitable tangible, non-transitory computer-readable storage media. The memory 52 may store thereon computer-executable instructions 53 that are executable by the processor 50 to convert the output of or signal generated by the accelerometer 33 into a value that is indicative of the position of the actuator 31 of the valve 30, and to populate the value into a field of a wireless position signal. The computer-executable instructions 53 may be further executable to cause the wireless position signal to be transmitted from the transducer 32 via a wireless interface 55. The wireless interface 55 may be communicatively coupled to one or more wireless communication channels 12, and the wireless interface 55 may include a transceiver, or may include a transmitter and a receiver. As such, the processor 50, the instructions 53 and/or the wireless interface 55 may serve as a feedback position signal generator 58 that generates and transmits feedback position signals from the sensor 32 to the controller 20 and/or to other devices of the process control system. In some embodiments, the wireless accelerometer position sensor or actuator 32 may include one or more of the features, aspects, and/or techniques of embodiments of the wireless position transducer described in aforementioned U.S. patent application Ser. No. 14/086,102, entitled "Wireless Position Transducer for a Valve" and filed on Nov. 21, 2013.

For example, in some scenarios, the wireless position feedback signal is one or more packets in accordance with the wireless HART protocol, the wireless communication channels 12 are included in a wireless mesh communication network of the process control system 1, and the packet is transmitted and received over the wireless communication channel 12 according to a schedule generated by a network manager of the wireless mesh communication network. For example, the network manager may generate a network communications schedule (e.g., "network schedule") defining transmission slots for packets generated by the wireless accelerometer position transducer 32, so that the packets are received at the controller 20 to accurately and safely control the valve 30 and the process of which the valve 30 is a part. In an embodiment, one or more portions of the schedule pertaining to the wireless mesh transducer 32 may be delivered to the transducer 32 (e.g., from the network manager via the wireless communication network) and stored in the memory 52, so that the processor 50 may cause packets or signals to be transmitted to the controller 20 in accordance with the stored schedule.

In some scenarios, the wireless position signal is one or more packets in accordance with a short-range and/or near-field wireless communication protocol. For example, the wireless position signal may be in accordance with the Zigbee, Wi-Fi, or Bluetooth protocol. In some embodiments, the wireless position signal may be in accordance with an IR or UWB protocol. Typically, the wireless position signal is in accordance with a wireless communication protocol that allows low power consumption.

The wireless position signal may be transmitted via the wireless interface 55 to the electro-pneumatic controller 20 to control the valve 30. In an embodiment, the wireless position signal may be additionally or alternatively transmitted via the wireless interface 55 to the control system 2 for position monitoring or other purposes. For example, the wireless position signal may be transmitted to a control system host of the control system 2. In some embodiments, the protocol utilized to transmit the wireless position signal to the controller 20 and to the control system 2 may be the same wireless protocol, and in some embodiments, the protocol utilized to transmit the wireless position signal to the controller 20 may be a different wireless protocol than that utilized to transmit the wireless position signal to the control system 2. The wireless position signal may be transmitted to the control system 2 either directly or via one or more intermediate nodes included in a wireless communication network of the process control plant or system 1. In an embodiment, the processor may cause packets or signals to be transmitted to the control system 2 in accordance with a schedule stored in the memory 52, where the schedule is generated by a network manager of a wireless communication network coupled to the wireless interface 55.

In the embodiment illustrated in FIG. 2, the wireless accelerometer position sensor or actuator 32 includes an energy harvesting device 40. The energy harvesting device 40 may harvest energy from one or more portions or elements of the sensor 32, e.g., from the accelerometer 32, the processor 50, and/or the communication interface 55. For example, the energy harvesting device 40 may harvest local heat, vibration and/or movement, and may provide the harvested energy to the energy storage device 38. In some embodiments (not shown), the energy harvesting device 40 is omitted from the sensor or transducer 32.

FIG. 2 also includes a detailed block diagram of the electro-pneumatic controller 20 of FIG. 1. As previously discussed, the controller 20 includes a first input or interface 22 to receive a control signal from the control system 2, and a second input or interface 24 to receive the wireless position signal from the wireless accelerometer position sensor or transducer 32. The wireless interface 24 may be communicatively coupled to one or more wireless communication channels 12 over which the wireless position signal generated by the wireless accelerometer position transducer 32 is received. The wireless interface 24 may include a transceiver, or may include a transmitter and a receiver.

The first interface 22 may be a wired interface, a wireless interface, or a wired and a wireless interface coupled to one or more communication channels 10. In embodiments in which the first interface 22 includes a wireless interface, the first interface 22 and the second interface 24 may be a single integrated wireless interface. In an embodiment, the one or more communication channels 10 and/or the one or more communication channels 12 are included a wireless mesh communication network of the process plant or system 1.

The electro-pneumatic controller 20 further includes a control unit or processor 60 coupled to a memory 62, to the inputs 22, 24, and to the output 25. The memory 62 may be a tangible, non-transitory memory, and may include one or more computer-readable storage media. For example, the memory 62 may be implemented as one or more semiconductor memories, magnetically readable memories, optically readable memories, and/or any other suitable tangible, non-transitory computer-readable storage media. The memory 62 may store computer-executable instructions that are executable by the processor 60 to determine, based on the received wireless position signal from the second interface 24 and the received control signal from the first interface 22, a value of a drive signal to be transmitted via the output 25 to control the valve 30. For example, the computer-executable instructions to determine the drive signal comprise a position control algorithm or process that is downloaded during configuration and/or during real-time from the control system 2.

Figure 3:
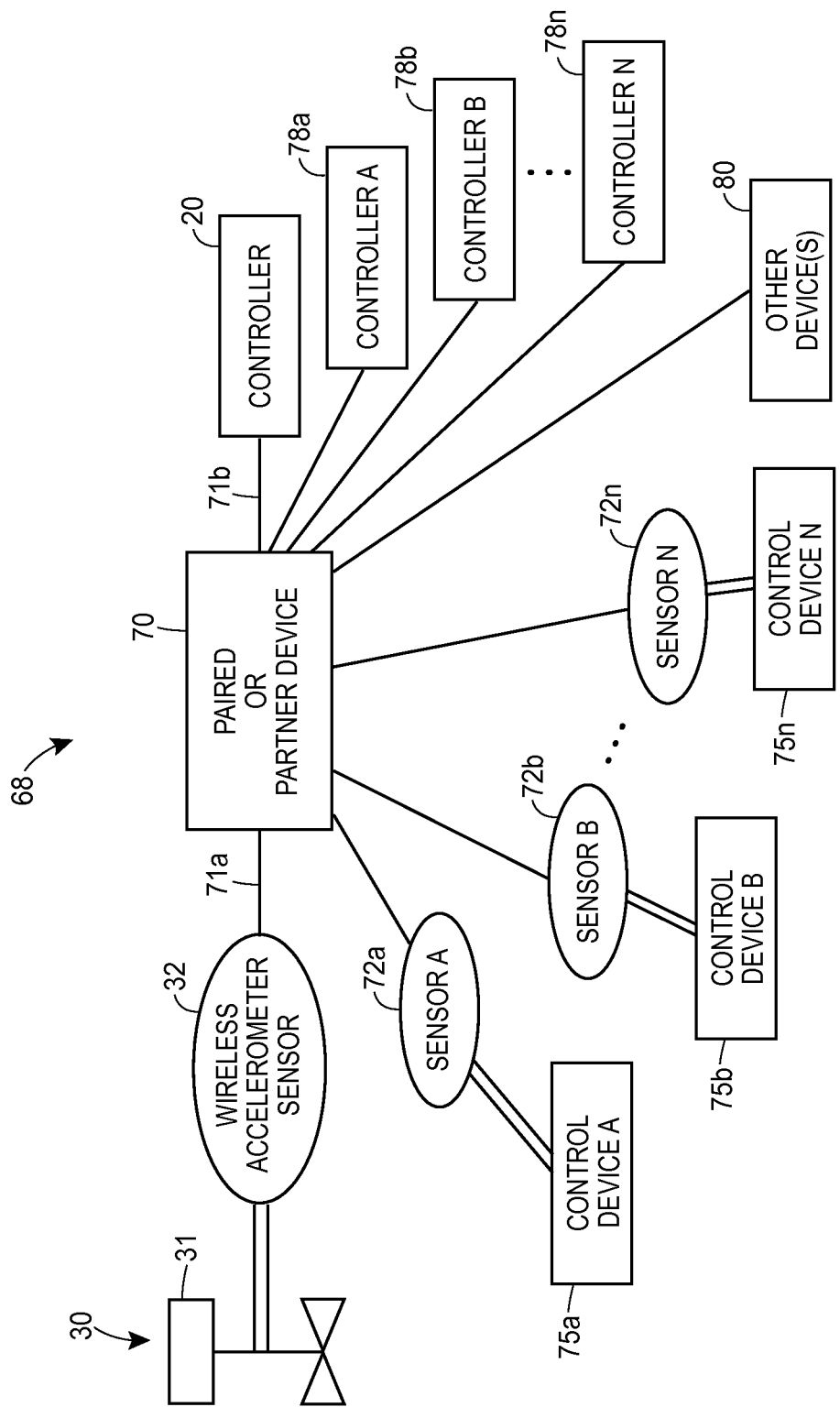
FIG. 3 is a block diagram of an example arrangement of a wireless accelerometer position transducer or sensor, a paired or partner device, and a controller.

FIG. 3 illustrates an example arrangement 68 in which the wireless position accelerometer sensor or transducer 32 is communicatively connected to a paired or partner device 70 via a wireless communication channel 71a, and the paired or partner device 70 is in communicatively connected to the controller 20 via another communication channel 71b. The arrangement 68 may include the wireless accelerometer position sensor 32, the valve 30, and/or the controller 20 of FIGS. 1 and 2. Such an arrangement 68 may be advantageous, for example, when a direct wireless connection between the sensor 32 and the controller 20 is sub-optimal due to process plant topology, and/or for other reasons.

For example, in some process plants, such an arrangement 68 may be advantageous to decrease equipment and installation costs. As shown in FIG. 3, the paired or partner device 70 may be paired not only with the accelerometer sensor or transducer 32, but may also be paired with one or more other sensors or transducers 72a-72n, each of which may be at least partially mounted on a respective control device 75a-75n to provide position feedback for the respective control device 75a-75n. The set of other sensors 72a-72n may include one or more other accelerometer wireless position sensors, one or more other types of wireless position sensors (e.g., wireless position sensors that utilize magnets, magnet arrays, potentiometers, etc.), and/or one or more traditional wired position sensors. Thus, in some embodiments, a single paired device 70 may service multiple sensors or transducers 32, 72a-72n, and may route, forward, or transmit received feedback position signals from said multiple sensors 32, 72-72n to respective receiving controllers 20, 78a-78n. In some cases, the paired device 70 may additionally route, forward, or transmit one or more of the received feedback position signals to one or more other devices 80 within the process control system, e.g., to a host, a data historian, a user interface, etc.

In an embodiment, the paired or partner device 70 receives a wireless position feedback signal from the sensor 32 by using a first wireless protocol (e.g., a first short-range wireless protocol such as Bluetooth), and the paired or partner device 70 transmits a resultant position feedback signal by using a second wireless protocol (e.g., WirelessHART or a second short-range wireless protocol such as Zigbee) or by using a wired protocol (e.g., HART). In an embodiment, the paired or partner device 70 receives a wireless position feedback signal from the sensor 32 and transmits a resultant position feedback signal using the same wireless protocol.

Figure 4:
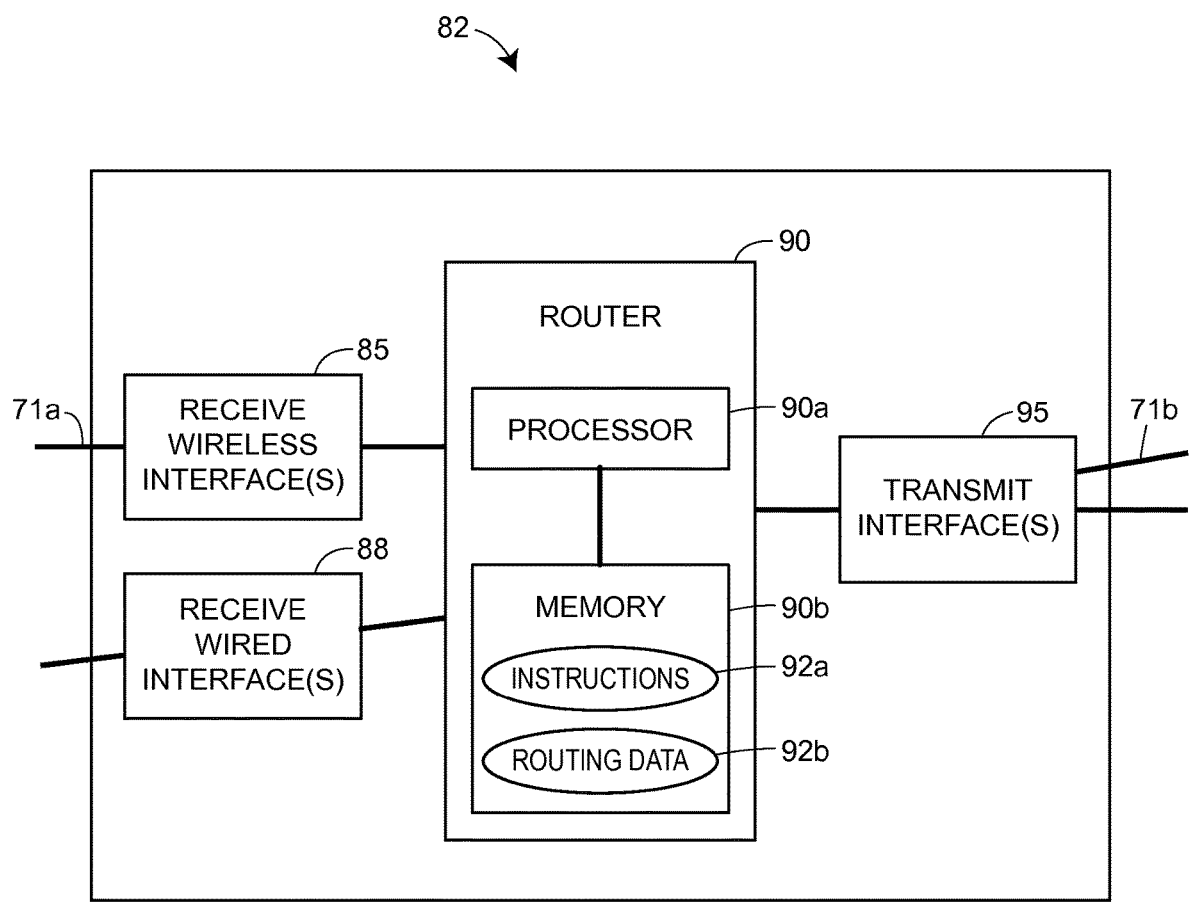
FIG. 4 is a block diagram of an example paired or partner device that may be communicative connection with the wireless accelerometer position transducer or sensor of FIG. 1.

Turning now to FIG. 4, an embodiment 82 of the paired or partner device 70 of FIG. 3 is depicted. As illustrated in FIG. 4, the paired or partner device 82 includes a wireless receive communication interface 85 coupled to the wireless communication channel 71a via which the paired or partner device 82 receives communications from the wireless accelerometer position sensor 32. For instance, the paired/partner device 82 receives feedback position signals from the accelerometer position sensor 32 via the wireless communication channel 71a and the wireless receive interface 85. Additionally, as the paired/partner device 82 may receive communications from one or more of the other wireless sensors or transducers 72a-72n with which the device 82 is paired, the paired/partner device 82 may include multiple types of wireless receive communication interfaces 85 (e.g., Zigbee, Bluetooth, Wi-Fi, WirelessHART, etc.) to receive position feedback signals from different types of wireless position sensors or transducers 72a-72n. In some cases, the paired or partner device 82 may include one or more wired receive communication interfaces 88 to receive position feedback signals from one or more traditional wired sensors 72a-72n.

Further, the paired or partner device 82 includes a router or routing means 90 to determine a recipient controller or device of a received position feedback signal. In the example illustrated in FIG. 4, the router 90 includes a processor 90a and a non-transitory, tangible memory 90b storing thereon computer-executable instructions 92a and routing data 92b. The processor 90a may execute the stored instructions 92a to determine, by using the routing data 92b, the particular recipient controller(s) or device(s) of a particular feedback position signal, and to cause the particular feedback position signal to be transmitted to the recipient device(s) using an appropriate transmit communication interface 95. For example, the feedback position signal indicative of the position of the valve actuator 31 may be transmitted to the controller 20 via the transmit communication interface 95 and the communication channel 71b. The transmit communication interface 95 may support a wireless protocol such as Zigbee, Bluetooth, Wi-Fi, WirelessHART, etc. In some configurations, the transmit communication interface 95 may support a wired communication protocol, such as Ethernet, HART®, FOUNDATION® Fieldbus, Ethernet, EthernetIP, DeviceNet, CompNet, ControlNet, Modbus, or a process control-specific big data protocol. In some embodiments, the paired or partner device 82 includes multiple transmit communication interfaces 95 to multiple different types of recipient controller(s) and device(s). In some cases, the transmit communication interface(s) 95 and the receive communication interfaces 85, 88 are the same or integral communication interfaces.

Figure 5:
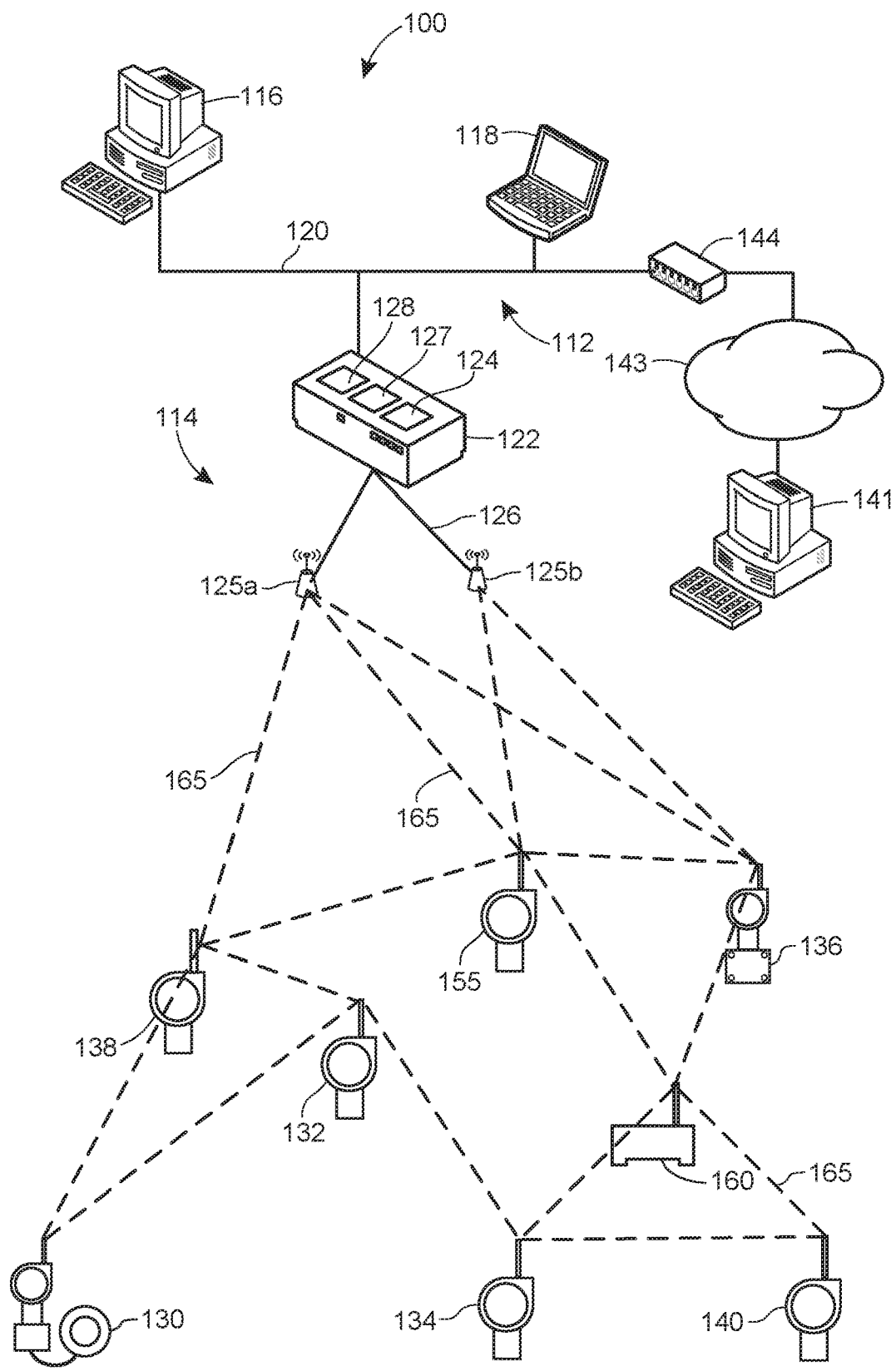
FIG. 5 is a block diagram that illustrates an example process control system utilizing a wireless communication network to provide wireless communication between process control devices, controllers, routers, and other network devices.

FIG. 5 illustrates an exemplary process control network 100 into which the wireless accelerometer position transducer 32 of FIG. 1 and, optionally, the feedback device 70, 82 may be incorporated. In an embodiment, the process control network 100 is included in the control system 1 of FIG. 1. In particular, the network 100 may include a plant automation network 112 and a communications network 114. In the embodiment of the process control network 100 shown in FIG. 1, the communications network 114 is illustrated as a wireless mesh communications network. In an embodiment, the communications network 114 supports a wireless HART (Highway Addressable Remote Transducer) protocol, e.g., a "wireless HART network." In some embodiments of the network 100, however, the communications network 114 may support a wired HART protocol, e.g., a "wired HART network." In some embodiments, both a wired and a wireless HART network 114 may be included in the network 100.

The plant automation network 112 may include one or more stationary workstations 116 and one or more portable workstations 118 connected over a communication backbone 120. The workstations 116, 118 are interchangeably referred to herein as "workstations," "control system hosts," "control hosts," or "hosts" of the process control network 100. The backbone 120 may be implemented over Ethernet, RS-485, Profibus DP or other suitable communication protocol.

The plant automation network 112 and the wireless HART network 114 may be connected via a gateway 122. Specifically, the gateway 122 may be connected to the backbone 120 in a wired manner and may communicate with the plant automation network 112 by using any suitable known protocol. The gateway 122 may be implemented as a standalone device, as a card insertable into an expansion slot of the hosts or workstations 116 or 118, or as part of the IO subsystem of a PLC-based or DCS-based system, or in any other manner. The gateway 122 may provide, to applications running on the network 112, access to various network devices of the wireless HART network 114. In addition to protocol and command conversion, the gateway 122 may provide synchronized clocking used by time slots and superframes (sets of communication time slots spaced equally in time) of the scheduling scheme of the wireless HART network 114.

In some situations, networks may have more than one gateway 122. These multiple gateways can be used to improve the effective throughput and reliability of the network by providing additional bandwidth for the communication between the wireless HART network and the plant automation network 112 or the outside world. On the other hand, the gateway 122 device may request bandwidth from the appropriate network service according to the gateway communication needs within the wireless HART network. The gateway 122 may further reassess the necessary bandwidth while the system is operational. For example, the gateway 122 may receive a request from a host residing outside the wireless HART network 114 to retrieve a large amount of data. The gateway device 122 may then request additional bandwidth from a dedicated service such as a network manager in order to accommodate this transaction. The gateway 122 may then request the release of the unnecessary bandwidth upon completion of the transaction.

In some embodiments, the gateway 122 is functionally divided into a virtual gateway 124 and one or more network access points 125a, 125b. Network access points 125a, 125b may be separate physical devices in wired communication with the gateway 122 in order to increase the bandwidth and the overall reliability of the wireless HART network 114. However, while FIG. 1 illustrates a wired connection 126 between the physically separate gateway 122 and access points 125a, 125b, it will be understood that the elements 122-126 may also be provided as an integral device. Because network access points 125a, 125b may be physically separate from the gateway device 122, each of the access points 125a, 125b may be strategically placed in several distinct locations. In addition to increasing the bandwidth, the multiple access points 125a, 125b can increase the overall reliability of the network by compensating for a potentially poor signal quality at one access point at one or more other access points. Having multiple access points 125a, 125b also provides redundancy in case of failure at one or more of the access points 125a, 125b.

The gateway device 122 may additionally contain a network manager software module 127 (e.g., "network manager") and a security manager software module 128 (e.g., "security manager"). In another embodiment, the network manager 127 and/or the security manager 128 may run on one of the process control hosts 116, 118 of the plant automation network 112. For example, the network manager 127 may run on the host 116 and the security manager 128 may run on the host 118. The network manager 127 may be responsible for configuration of the network 114; scheduling communications between devices included in the network 114 such as wireless HART devices (i.e., configuring superframes); determining a network communication schedule and cause at least portions thereof to be delivered to recipient devices and controllers; managing routing tables; and monitoring and reporting the health of the wireless HART network 114. While redundant network managers 127 are supported, it is contemplated that there should be only one active network manager 127 per wireless HART network 114. In one possible embodiment, the network manager 127 analyzes the information regarding the layout of the network, the capability and update rate of each network device, and other relevant information. The network manager 127 may then define routes and schedules of communications to, from and between network devices in view of these factors. In an embodiment, the network manager 127 may be included in one of the control hosts 116, 118.

Referring again to FIG. 5, the wireless HART network 114 may include one or more field devices or control devices 130-140. In general, process control systems, like those used in chemical, petroleum or other process plants, include such field devices as valves, valve positioners, switches, sensors (e.g., temperature, pressure and flow rate sensors), pumps, fans, etc. Field devices may perform process control functions within a process that is controlled by the process control network 100. A process control function may include, for example, opening or closing valves and/or monitoring or taking measurements of process parameters. In the wireless HART communication network 114, field devices 130-140 are producers and consumers of wireless HART packets.

An external host 141 may be connected to an external network 143 which, in turn, may be connected to the plant automation network 112 via a router 144. The external network 143 may be, for example, the World Wide Web (WWW). Although the external host 141 does not belong to either the plant automation network 112 or the wireless HART network 114, the external host 141 may access devices on both networks 112, 114 via the router 144. Accordingly, the communication network 114 and the plant automation network 112 of the process control system 100 may be private networks, so that access to the networks 112, 114 is secured. For example, devices wishing to connect to the network 112 and/or the network 114 may be required to be authorized. Similarly, the external host 141 may control secure network access for communications from the external network 143.

The wireless HART network 114 may use a protocol which provides similar operational performance that is experienced with wired HART devices. The applications of this protocol may include process data monitoring, critical data monitoring (with the more stringent performance requirements), calibration, device status and diagnostic monitoring, field device troubleshooting, commissioning, and supervisory process control. These applications require that the wireless HART network 114 use a protocol which can provide fast updates when necessary, move large amounts of data when required, and support network devices which join the wireless HART network 114 only temporarily for commissioning and maintenance work.

In one embodiment, the wireless protocol supporting network devices of the wireless HART network 114 is an extension of HART, a widely accepted industry standard that maintains the simple workflow and practices of the wired environment. The wireless HART protocol may be used to establish a wireless communication standard for process applications and may further extend the application of HART communications and the benefits it provides to industry by enhancing the HART technology to support wireless process automation applications.

Referring again to FIG. 5, field or control devices 130-140 may be wireless HART devices. In other words, a field device 130, 132, 134, or 136 may be provided as an integral unit supporting all layers of the wireless HART protocol stack. In the network 100, the field device 130 may be a wireless HART flow meter, and the field device 136 may a wireless HART pressure sensor.

In particular, the field device 134 may be a valve or a valve positioner including a wireless accelerometer position transducer (such as the wireless accelerometer position transducer 32 of FIG. 1), and the field device 132 may be a controller (such as the controller 20 of FIG. 1) that receives sensed position indications from the wireless accelerometer position transducer of the field device 134. In an embodiment, the control host 116 and/or the control host 118 each receives at least some of the position indications from the field device 134, such as via the wireless mesh communication network 114, the gateway 122, and the plant automation network 120.

Additionally, the wireless HART network 114 may include a router device 160. The router device 160 may be a network device that forwards packets from one network device to another. A network device that is acting as a router device may use internal routing tables to decide to which network device it should forward a particular packet. Stand alone routers such as the router 160 may not be required in those embodiments where all devices on the wireless HART network 114 support routing. However, it may be beneficial (e.g. to extend the network, or to save the power of a field device in the network) to add a dedicated router 160 to the network.

All devices directly connected to the wireless HART network 114 may be referred to as network devices. In particular, the wireless HART field or control devices 130-140, the routers 160, the gateway 122, and the access points 125a, 125b are, for the purposes of routing and scheduling, the network devices or the nodes of the wireless HART network 114. In order to provide a very robust and an easily expandable network, it is contemplated that all network devices may support routing and each network device may be globally identified by its HART address. Additionally, each network device may store information related to update rates, connections sessions, and device resources. In short, each network device maintains up-to-date information related to routing and scheduling. The network manager 127 communicates this information to network devices upon initialization or re-initialization of the network devices, whenever new devices join the network, or whenever the network manager detects or originates a change in topology or scheduling of the wireless HART network 114.

Referring again to FIG. 5, in a pair of network devices connected by a direct wireless connection 165, each device recognizes the other as a neighbor. Thus, network devices of the wireless HART network 114 may form a large number of connections 165. The possibility and desirability of establishing a direct wireless connection 165 between two network devices is determined by several factors such as the physical distance between the nodes, obstacles between the nodes, signal strength at each of the two nodes, etc. Further, two or more direct wireless connections 165 may form paths between nodes that cannot form a direct wireless connection 165. For example, the direct wireless connection 165 between the wireless HART hand-held device 155 and wireless HART device 136 along with the second direct wireless connection 165 between the wireless HART device 136 the router 160 form a communication path between devices 155 and 160.

Each wireless connection 165 is characterized by a large set of parameters related to the frequency of transmission, the method of access to the radio resource, etc. One of ordinary skill in the art will recognize that, in general, wireless communication protocols may operate on designated frequencies, such as the ones assigned by the Federal Communications Commission (FCC) in the United States, or in the unlicensed part of the radio spectrum (2.4 GHz). While the system and method discussed herein may be applied to a wireless network operating on any designated frequency or range of frequencies, the embodiment discussed below relates to the wireless HART network 114 operating in the unlicensed or shared part of the radio spectrum. In accordance with this embodiment, the wireless HART network 114 may be easily activated and adjusted to operate in a particular unlicensed frequency range as needed.

Figure 6:
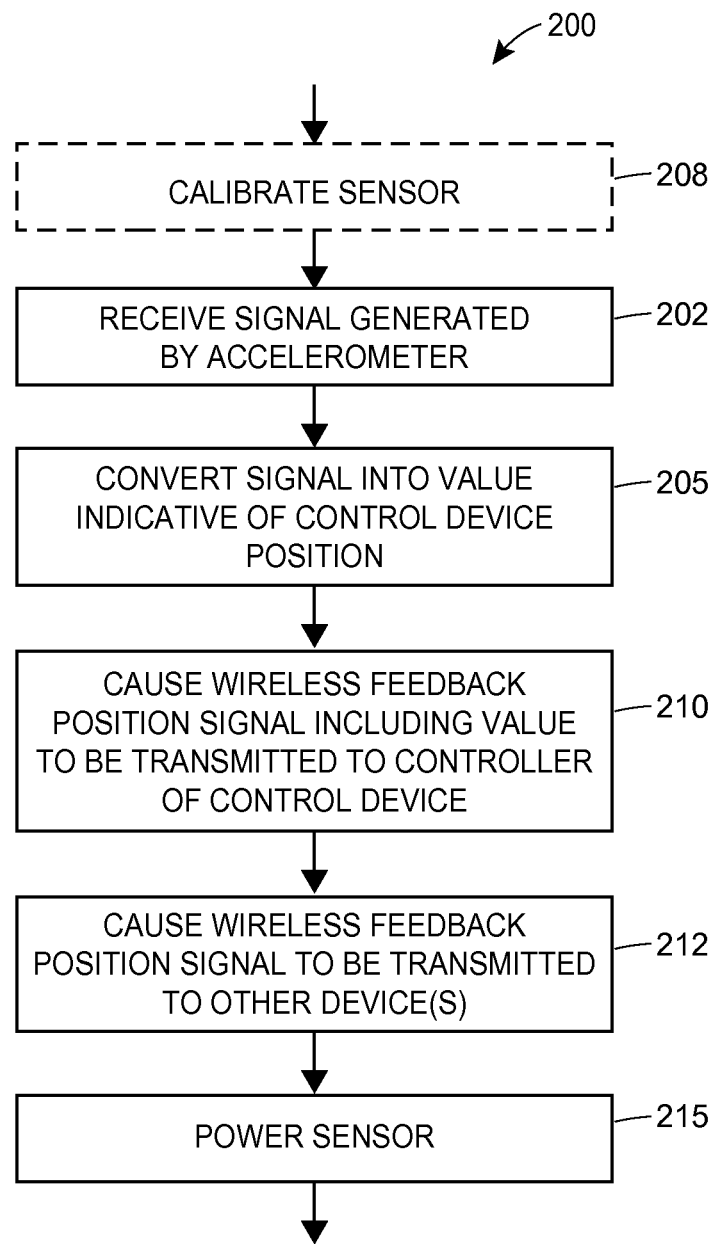
FIG. 6 is an example method of providing a wireless position feedback signal to a controller.

FIG. 6 is a flowchart of an example method 200 for providing position feedback to a controller of a control device. In an embodiment, the method 200 may be performed by a processor and/or other element of a wireless accelerometer position sensor or transducer, such as the processor 50 of the wireless accelerometer position sensor or transducer 32 of FIG. 1, or by another position sensor or transducer. The method 200 may operate in conjunction with the example electro-pneumatic controller 20, any number of the example configurations shown in FIGS. 1-5, and/or with other suitable controllers, control devices, and/or configurations.

The method 200 may be implemented using any combination of any of the foregoing techniques such as, for example, any combination of firmware, software, discrete logic and/or hardware. Further, many other methods of implementing the example operations of FIG. 6 may be employed. For example, the order of execution of the blocks may be changed, and/or one or more of the blocks described may be changed, eliminated, sub-divided, or combined. Additionally, any or all of the method 200 may be carried out sequentially and/or carried out in parallel by, for example, separate processing threads, processors, devices, discrete logic, circuits, etc. It is noted that the method 200 is described with simultaneous reference to FIGS. 1-5 for ease of discussion, however, this discussion is not limiting.

At a block 202, the method 200 includes receiving a signal (e.g., an output signal) generated by an accelerometer that is physically coupled to a control device or portion thereof. In an embodiment, the accelerometer is included in a position sensor or transducer mounted on an actuator of the control device. For instance, the accelerometer may be included in a wireless accelerometer position sensor or transducer 32 mounted on a stem or actuator 31 of a valve 30, such as depicted in FIG. 1. In an embodiment, the signal or an indication of the signal may be received (block 202) at a processor that is included in the position sensor (e.g., the processor 50 of the sensor 32). In an embodiment, the processor and the accelerometer may be communicatively connected but included in different devices (not shown).

The method 200 further includes converting the received accelerometer signal into a value indicative of a position of the control device or portion thereof to which the accelerometer is coupled (block 205). In an embodiment, the conversion is based on a calibration of the accelerometer or based on a calibration of the accelerometer position sensor. For example, the method 200 may optionally include calibrating the position sensor or transducer (block 208). Calibrating the position sensor or transducer (block 208) may include determining a value or signal generated by the accelerometer at a known position of the control device or portion thereof to which the accelerometer is attached (e.g., an initial or known position of a valve actuator 31 corresponding to a valve state, such as valve fully open, valve fully closed, or some other known position), and storing the initial or calibrated value indicative of the initial or calibrated position into a memory. Subsequently, the block 205 of the method 200 may obtain the stored, calibrated value from the memory and use the calibrated value to convert the received accelerometer signal into the current feedback position value (block 205). In an embodiment, the calibration is a single or only calibration.

The feedback position value indicative of the actuator position may be populated into a field of a wireless feedback position signal. In an embodiment, the wireless feedback position signal is in accordance with a wireless HART protocol. In an embodiment, the wireless feedback position signal is in accordance with a short-range or NFC wireless protocol, such as Zigbee, UWB, Bluetooth, etc.

The method 200 includes causing the wireless feedback position signal to be wirelessly transmitted, using a wireless protocol, to an electro-pneumatic controller of the valve to control the valve (block 210). In an embodiment, the wireless feedback position signal is directly transmitted from a wireless accelerometer position sensor 32 to an electro-pneumatic controller 20 to control the valve 30. In an embodiment, the wireless feedback position signal is transmitted from the wireless accelerometer position sensor 32 to a paired or partner device 70 that is disposed in between the wireless accelerometer position sensor 32 and a controller 20 of the control device 30. For example, the wireless feedback position signal may be transmitted from the sensor 32 to the paired device 70, and the paired device 70 may cause the wireless feedback position signal or equivalent thereof to be transmitted to the controller 20.

In an embodiment, the wireless position signal is an only input received from the valve 30 that is required by the controller 20 to control the valve 30. In an embodiment, the wireless position signal is in accordance with a wireless HART communication protocol. In an embodiment, the wireless feedback position signal is in accordance with a short-range or NFC wireless protocol. The wireless position signal may be transmitted to the electro-pneumatic controller over a communication channel of a wireless mesh communication network in some situations, such as according to a schedule generated by a network manager of the wireless mesh communication network. In an embodiment, a wireless communication channel over which the signal is transmitted is an only connection between the wireless position transducer and the controller.

The method 200 may optionally include causing the signal to be wirelessly transmitted to a control host or another device of a process plant or process control system in which the valve and the electro-pneumatic controller are included (block 212). For example, the wireless position signal may be transmitted to one or more other controllers 78a-78n or to another device 80 such as a control system host 116, 118 of a process control system 100. In an embodiment, the wireless position signal is transmitted to the control system host over a wireless mesh communication network in accordance with a schedule generated by a network manager of the wireless mesh communication network.

Some embodiments of the method 200 may include only one of the blocks 210 and 212, and some embodiments of the method 200 may include both blocks 210 and 212.

In an embodiment, the method 200 includes powering the wireless position sensor or transducer by a power source (block 215). For example, the wireless accelerometer position transducer 32 (e.g., the processor 50 and/or the communication interface 55 of the wireless accelerometer position transducer 32) may be powered by the power source 38. Typically, the power source is a local power source that is physically proximate to the wireless position transducer, such as a direct, local wired connection to a power source, a battery, a capacitor, or other suitable local power source, or an inductive power source. In some embodiments, the local power source is included in the wireless position transducer as an integral unit.

In some embodiments, the power source is a rechargeable energy storage device, and the method 200 may include recharging the rechargeable energy source using any known recharging technique, such as the capturing and conversion of solar energy, battery replacement, energy recovery of local heat, vibration and/or movement, a temporary connection to a plug-in source such as a DC power source, induction using a proximity charger, or any other suitable recharging means or mechanism. For example, the power source 38 may be recharged by the energy harvester 40 of the sensor 32.

At least some of the various blocks, operations, and techniques described above may be implemented in hardware, a processor executing firmware and/or software instructions, or any combination thereof. For instance, at least portions of the wireless accelerometer position transducer 32 may be implemented in hardware, a processor executing firmware and/or software instructions, or any combination thereof. Additionally, at least a portion of the blocks of FIG. 6 may be implemented in hardware, a processor executing firmware and/or software instructions, or any combination thereof.

When implemented utilizing a processor executing software or firmware instructions, the software or firmware instructions may be stored in any non-transitory, tangible computer readable storage medium such as a magnetic disk, an optical disk, a RAM or ROM or flash memory, tape drive, etc. The software or firmware instructions may include machine readable instructions stored on a memory or other non-transitory computer-readable storage medium that, when executed by the processor, cause the processor to perform various acts.

When implemented in hardware, the hardware may comprise one or more of discrete components, an integrated circuit, an application-specific integrated circuit (ASIC), a programmable logic device, etc.

Further, although the forgoing text sets forth a detailed description of numerous different embodiments, it should be understood that the scope of the patent is defined by the words of the claims set forth at the end of this patent and their equivalents. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed:

1. A system for providing position feedback for use in a process control system included in an industrial process plant, the system comprising:
   (i) a first position sensor that is a unitary device, the first position sensor including:
      an accelerometer physically coupled to an actuator of a control device disposed in the industrial process plant, the accelerometer sensing a position of the actuator, the sensed actuator position indicative of an intermediate position of the control device, and the intermediate position being a position disposed between two end positions of the control device;
      a wireless communication interface via which the first position sensor is communicatively connected to a feedback device paired with the first position sensor;
      a processor coupled to the accelerometer and to the wireless communication interface;
      a memory storing computer-executable instructions that, when executed by the processor, cause the first position sensor to generate a first wireless signal having a value indicative of the position of the actuator coupled to the control device and transmit, using a first wireless protocol, the generated first wireless signal via the wireless communication interface to the feedback device, the first wireless protocol being a first near-field or short-range wireless communication protocol; and
      a power source to power the processor and the communication interface of the first position sensor; and
   (ii) the feedback device that is paired with the first position sensor, the feedback device having:
      a first wireless communication interface supporting the first wireless protocol and via which the first wireless signal generated by the first position sensor is received at the feedback device;
      a second wireless communication interface supporting a second wireless protocol via which a second wireless signal generated by a second sensor and indicative of a condition sensed by the second sensor is received at the feedback device, the second sensor paired with the feedback device, and the second wireless protocol being a second near-field or short-range wireless communication protocol different than the first near-field or short range wireless protocol; and
      a third wireless communication interface supporting a third wireless protocol via which the feedback device transmits, to a controller via a wireless mesh communication network in accordance with a schedule generated by a network manager of the wireless mesh communication network, a position feedback signal corresponding to the first wireless signal generated by the first position sensor so that the controller utilizes a value included in the position feedback signal in conjunction with a reference signal corresponding to a desired position of the control device to generate a drive signal to control an operation of the actuator to thereby control the control device to a set-point position, the reference signal provided by the process control system, the third wireless protocol being different than the first wireless protocol and the second wireless protocol, and the third wireless protocol being in accordance with a wireless communication industry standard that supports process automation applications.

2. The system of claim 1, wherein the feedback device is further communicatively connected to a control system host of the process control system.

3. The system of claim 1, wherein the first wireless communication interface is coupled to a wireless communication channel, and the wireless communication channel forms an exclusive connection between the first position sensor and the feedback device paired with the first position sensor.

4. The system of claim 1, wherein the power source is rechargeable.

5. The system of claim 4, further comprising an energy harvester, the energy harvester to harvest energy generated by one or more portions of the first position sensor to recharge the power source.

6. The system of claim 1, wherein the value indicative of the position of the actuator is based on a calibrated position of the first position sensor.

7. The system of claim 1, wherein the control device is a valve.

8. The system of claim 1, wherein:
the position feedback signal is a first feedback signal;
the controller is a first controller; and
the feedback device transmits, via the third wireless communication interface, a second feedback signal to the first controller, a second controller, or a control system host of the process control system, the second feedback signal based on the received second wireless signal.

9. The system of claim 8, wherein the condition sensed by the second sensor is a position of another device and the second feedback signal is a second position feedback signal.

10. The system of claim 8, wherein the feedback device further includes a fourth communication interface, and the signal generator transmits the second feedback signal to the second controller via the fourth communication interface and by using a fourth communication protocol, the fourth communication protocol being different than the first, second, and third wireless protocols.

11. A system for providing position feedback in a process control system included in an industrial process plant, the system comprising:
a first sensor device, the first sensor device being a unitary device including an accelerometer, a processor, and a respective wireless communication interface via which a first wireless signal indicative of a position of an actuator coupled to a control device used in controlling a process operating in the process control system is transmitted from the first sensor device, the first wireless signal being of a first wireless communication protocol and generated by the first sensor device based on the accelerometer, the first wireless protocol being a first near-field or short-range wireless protocol, the control device disposed in the industrial process plant, the accelerometer being physically coupled to the actuator of the control device and sensing the position of the actuator, the position of the actuator indicative of an intermediate position of the control device, and the intermediate position being a position disposed between two end positions of the control device;
a second sensor device having a respective wireless communication interface via which a second wireless signal indicative of a condition sensed by the second sensor device is transmitted from the second sensor device; the second wireless signal being a second near-field or short-range wireless protocol different than the first near-field or short-range wireless protocol; and
a feedback device to which each of the first sensor device and the second sensor device is paired, the feedback device including:
a first communication interface via which the first wireless signal of the first wireless communication protocol and generated by the first sensor device is received by the feedback device;
a second communication interface via which the second wireless signal of the second wireless communication protocol and generated by the second sensor device is received by the feedback device; and
a signal generator to generate and transmit a position feedback signal of a third wireless communication protocol via a third communication interface of the feedback device to at least one of a controller of the control device or a control system host of the process control system, the controller utilizing a value indicative of the position of the actuator in conjunction with a reference signal corresponding to a desired position of the control device to generate a drive signal to control an operation of the actuator to thereby control the control device to a set-point position, the reference signal provided by the process control system, the position feedback signal based on the received first wireless signal, the third wireless protocol being different than the first wireless protocol and the second wireless protocol, and the third wireless protocol being in accordance with a wireless communication industry standard that supports process automation applications.

12. The system of claim 11, wherein:
the position feedback signal is a first feedback signal;
the controller is a first controller; and
the signal generator generates and transmits a second feedback signal to the first controller, a second controller, or the control system host, the second feedback signal based on the received second wireless signal.

13. The system of claim 12, wherein the condition sensed by the second sensor device is a position of another device and the second feedback signal is a second position feedback signal.

14. The system of claim 12, wherein the signal generator transmits the second feedback signal to the second controller via a fourth communication interface and by using a fourth communication protocol, the fourth communication protocol being different than the first, second, and third wireless protocols.

15. The system of claim 11, wherein the control device is a valve.

16. The system of claim 11, wherein the accelerometer of the first sensor device generates an output signal, and wherein a value of the first wireless signal received at the feedback device is indicative of the position of the actuator and is based on the output signal generated by the accelerometer.

* * * * *

UNITED STATES PATENT AND TRADEMARK OFFICE
CERTIFICATE OF CORRECTION

PATENT NO. : 10,996,236 B2
APPLICATION NO. : 14/338065
DATED : May 4, 2021
INVENTOR(S) : Mitchell S. Panther et al.

Page 1 of 1

It is certified that error appears in the above-identified patent and that said Letters Patent is hereby corrected as shown below:

In the Specification

Column 1, Line 59, "a electro-pneumatic" should be -- an electro-pneumatic --.

Column 18, Lines 44-45, "Stand alone" should be -- Stand-alone --.

Signed and Sealed this
Twenty-seventh Day of August, 2024

Katherine Kelly Vidal
*Director of the United States Patent and Trademark Office*